United States Patent [19]

Hestad et al.

[11] 4,232,200
[45] Nov. 4, 1980

[54] DIALING SYSTEM

[75] Inventors: Alfred M. Hestad; Jan Synek; Harold O. Hansen, all of Chicago, Ill.

[73] Assignee: United Networks, Inc., Chicago, Ill.

[21] Appl. No.: 953,885

[22] Filed: Oct. 23, 1978

[51] Int. Cl.² .................. H04M 1/274; H04M 19/08
[52] U.S. Cl. ............................ 179/90 K; 179/90 B; 179/16 EC; 179/77
[58] Field of Search ............... 179/90 K, 90 B, 90 R, 179/16 EC, 77

[56] References Cited

U.S. PATENT DOCUMENTS

| | | | |
|---|---|---|---|
| 3,856,982 | 12/1974 | Lawson et al. | 179/90 K |
| 3,920,926 | 11/1975 | Lenaerts et al. | 179/90 B |
| 3,956,596 | 5/1976 | Connolly et al. | 179/90 K |
| 3,973,084 | 8/1976 | Hovland | 179/90 K |
| 3,980,837 | 9/1976 | Jakobsson | 179/90 K |
| 4,008,379 | 2/1977 | Watkins | 179/90 K |
| 4,008,380 | 2/1977 | La Borde | 179/90 B |
| 4,119,810 | 10/1978 | Marin et al. | 179/90 K |

FOREIGN PATENT DOCUMENTS

| | | | |
|---|---|---|---|
| 586493 | 8/1974 | Switzerland | 179/90 K |
| 1426585 | 3/1976 | United Kingdom | 179/90 K |

*Primary Examiner*—Gerald L. Brigance
*Attorney, Agent, or Firm*—Alter and Weiss

[57] ABSTRACT

An improved dialing system, basically powered through the line, that provides automatic dialing of stored, frequently used numbers and the last number dialed. Self-test capabilities are provided to enable and test all the stored number memory locations automatically. Outgoing call restrictions are provided with a programmable code to bypass the call restriction. The system automatically converts push button dialing to rotary outpulsing, or generates dual tone multi-frequency dialing signals.

14 Claims, 6 Drawing Figures

DIALING SYSTEM

This invention relates to telephone dialing systems; and more particularly, to line powered repertory dialing systems capable of storing a multiplicity of frequently used numbers.

Repertory dialing systems have been available for many years. These have been constantly improved, especially with the advent of solid-state circuitry capable of being used to provide the memory and the control of stored numbers. Such repertory dialing systems are found, for example, in U.S. Pat. Nos. 4,008,380; 3,860,765; 3,555,201; 3,860,765; 3,665,113; 3,670,111 and 3,735,050.

Each of the above-noted patents, except for U.S. Pat. Nos. 3,860,765 and 4,008,380, discloses systems which require separate switching arrangements for selecting the particular location of the number in the stored memory and for generating the signals to be stored within the selected locations.

The system of the '765 patent uses a single keyboard unit for controlling the storage of numbers in the memory or the direct dialing of the numbers utilizing an output pulse unit. This patent, however, requires a separate power supply for driving the pulse generator.

U.S. Pat. No. 4,008,380 teaches the use of line power for providing the conversion to the output pulses. However, this power is coupled through only in the off-hook condition.

Accordingly, an object of the present invention is to provide improved telephone dialing using solid-state processors and memories wherein the telephone is powered from the telephone line.

A related object of the present invention is to provide repertory dialing systems using solid-state memories with the line power connected to the memories in the on-hook condition.

Yet another object of the present invention is to provide line powered repertory dialing systems with means to assure that the memory is maintained, even where the telephone substation is unplugged from the line.

Another object of the present invention is to provide line powered repertory dialing systems wherein the numbers are programmed for dialing using the telephone subset keypad with the repertory numbers and the last number dialed being stored in an electronic memory.

Another related object of the present invention is to provide line powered repertory dialing using electronic solid-state processor and memory devices wherein the repertory system provides call restriction which can be bypassed by the programming of a secret code.

Yet another object of the present invention is to provide repertory dialing telephones that have self-test capability for automatically enabling all the memory locations to be tested.

Yet another related object of the present invention is to provide line powered telephone dialing systems with isolating means for the power supply used to power the processor and memory.

Still another object of the present invention is to provide solid-state telephone dialing systems having means to isolate both the negative and the positive voltages on the line between the telephone network and the processor and memory of the dialing system.

A preferred embodiment of the present invention includes a telephone repertory dial system, using electronic equipment, capable of converting from push button dialing to rotary outpulsing or dual-tone multi-frequency dialing wherein the electronic equipment obtains power, under normal conditions, from the telephone line. Batteries are provided, however, for power to selected portions of the electronic equipment, in the event the telephone is unplugged from the line; or where the telephone is operated over an excessively long loop length.

The telephone network is coupled to the telephone lines through a diode bridge. Electronic solid-state equipment including a processor and memory are also coupled to the telephone lines through the diode bridge. The positive side of the telephone network is connected through one side of bridge diodes, while the power supply utilized by the processor and the memory powered by the lines is connected to the positive side of the line via separate bridge diodes. This separation assures that the power supply for the processor and memory is not discharged through the network. The method of coupling the power supply to the lines also prevents leakage current from discharging the power supply.

In the on-hook condition, the power supply receives power from the line through a bypass resistor preventing the leakage current of the voltage suppressor from draining current from the power supply.

These and other objects and features of the present invention, together with the manner of obtaining them, will be best understood by making reference to the accompanying drawings, wherein.

Figure 1:
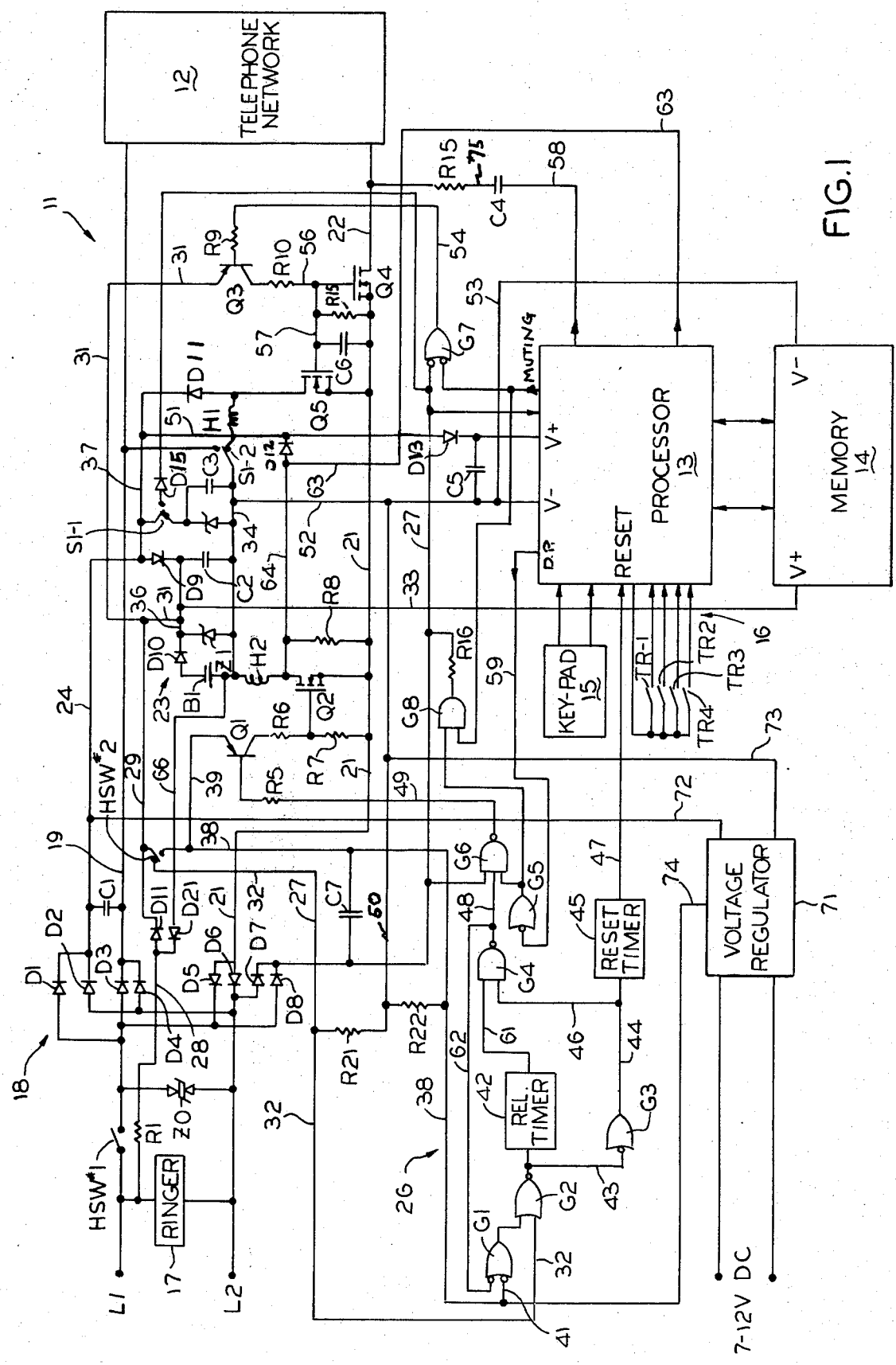
FIG. 1 is a simplified schematic showing of the repertory dialing telephone of the invention.

In the simplified schematic of a repertory telephone, shown as 11, a telephone network is shown connected to the telephone lines L1 and L2. The telephone network is indicated by a block 12. The repertory processor and memory are shown as blocks 13 and 14, respectively. Keypad 15 is shown connected to the processor for use in providing the inputs to the dialer for either repertory storage or obtaining selected dial pulses or dual-tone multi-frequency outputs. A series of switches, indicated at 16, is used for call restriction programming.

Called party signalling means, such as a ringer 17 are connected directly across lines L1 and L2. A voltage suppressor zener Z0 is shown also connected directly across lines L1 and L2.

Means, such as internal power supply 23 are provided for powering the processor 13, the memory 14 and related controls, such as control gate means 26.

Lines L1 and L2 are coupled through diode bridges 18 to the telephone network, the processor, power supply and the processor control gates. Means are provided for isolating the power supply, the network, the processor and the memory control gates from each other. For example, the bridge 18 comprises eight diodes, D1–D8, instead of the usual four diodes making up one bridge.

It can be seen that the lines L1 and L2 are connected to the positive side of the network through the diodes D3, D4 and conductor 19. The other side of the network is connected to lines L1 and L2 through the bridge diodes D5, D6, conductor 21, transistor Q4 and conductor 22.

The internal power supply, shown generally as basically a storage capacitor type a power supply 23 is connected to the lines L1 and L2 through diodes D1 and D2 and conductor 24. The use of separate diodes for coupling the power supply capacitor C3 assures that the power supply cannot be discharged through transistor Q4 and the network. The above mentioned and other means for reducing leakage, described hereinafter, reduce the size of capacitor C3 to practical limits.

Control gate means 26 are provided for controlling the processor 13. The gate means are also separately coupled to the lines by the diodes D7 and D8. More particularly, diodes D7 and D8 couple lines L1 and L2 to conductor 27 which is used as a direct input to certain of the control gates making up control gate means 26.

Means are provided for bypassing the hook switch in providing power to the internal power supply in the on hook condition. More particularly, the positive line L1 is coupled through resistor R1, conductor 28, diode D11, conductor 29, and conductor 31 to power supply 23.

If the line voltage is reversed such that a negative voltage is applied to the line L1 lead, then this negative voltage is coupled via resistor R1, diode D21 and conductor 66 to the anode side of zener diode Z1. It should be noted that with this arrangement, the leakage current through the voltage suppressor Z0 is prevented from draining current from the power supply 23.

To better understand the operation of the system, the explanation will consider the telephone in the "idle" condition, i.e., "on-hook"; the "origination" condition, i.e., "off-hook"; and the "dialing" condition.

Contacts HSW#1 and HSW#2 are shown in the "idle" or "on-hook" condition. Thus, contacts HSW#1 open the positive line L1 in the "on-hook" condition. While line L1 is open to the network 12, contacts HSW#2 couple the line L1 through resistor R1, conductor 28, diode D11, conductor 29, hook switch contacts HSW#2 and conductor 32 to the processor control circuitry i.e., gate means 26, and more particularly, to the non-inverting input of inverter gate G2.

It should be noted that the positive input of the memory 14 is coupled to internal power supply 23, over conductor 33 so that the memory is supplied with power from the telephone lines, even in the on-hook condition. It should be further noted that resistor R1 is in the order of magnitude of 10 meg Ohms to preclude interference with the telephone lines.

The telephone network is cut off from power, because of the open contacts HSW#1. The negative bus 34 of the power supply 23 is coupled to lines L1, L2, diodes D5, D6, conductor 21, resistor R8 and inductor H2. The power supply voltage is regulated by zener diode Z1 which extends between positive bus 36 and negative bus 34.

Means are provided for assuring that power is supplied to the memory and the logic gates, even if the telephone is unplugged. More particularly, a battery B1 is connected from bus 34 through diode D10 to bus 36. Capacitor C2 across lines 36 and 34 acts as a filter for the memory power supply.

Power supply storing capacitor C3 bridges zener Z2. In a preferred embodiment, capacitor C3 is in the order of 330 micro-farads. The negative voltage from the line is coupled through the rectifier bridge to the drain of VMOS transistors Q2, Q4 and Q5 over conductor 21. It should be noted that while VMOS transistors are shown, other high gain solid-state devices could be used with equal facility.

When the telephone is lifted and the telephone is put in its off-hook condition, then hook switch contacts HSW#1 and HSW#2 are operated.

Hook switch contacts HSW#1 connect the line voltage via the bridge to the network over a path already described. The positive line L1 is coupled to the power supply through diode D1. More particularly, when the L1 side of the line is positive, then the positive voltage passes from line L1 through diode D1, conductor 24, conductor 37 and contacts S1-1 to the capacitor C3 and the cathode of the zener Z2.

If the L2 side of the line is positive, then the positive voltage passes from line L2 through diode D2, conductor 24, conductor 37 and contacts S1-1 to the capacitor C3 and the cathode side of the zener Z2. The anode of the zener Z2 is coupled to the negative bus 34.

In the "talk mode" the anode side of the zener diode Z2 is coupled to the negative side of the line via negative bus 34, contacts S1-2, inductor H1, transistor Q5, conductor 21 and diode D5 or D6 depending on the polarity of the line.

In the "dialing mode" the anode side of zener diode Z2 is coupled to the negative side of the line via negative bus 34, inductor H2, transistor Q2, conductor 21 and diodes D5 or D6. Conductor 37 is coupled to conductor 36 through positive going diode D9.

The cathode side of diode D20 is connected to conductor 37. The anode side of diode D20 is connected to the junction of inductor H1 and the drain of transistor Q5. This diode clamps positive going spikes generated by inductor H1.

The cathode side of diode D12 is connected to conductor 51. The anode side of diode D12 is connected to conductor 64. This diode clamps positive going spikes generated by inductor H2.

When the voltage on the line L2 is negative, then line L2 is coupled through diode D6, conductor 21, to the drain of transistors Q2, Q4 and Q5.

Means are provided for detecting the off-hook condition. More particularly, hook switch contacts HSW#2 operate to open the connection from conductor 29 to conductor 32 and instead connects conductor 29 to conductor 38. This provides positive voltage to the emitter of PNP transistor Q1 over conductor 39. Positive voltage is also provided to one of the inputs of gate G1 over conductor 41.

The positive input to gate G1 causes its output to go low. The output of gate G1 is connected to the inverting input of inverter gate G2 causing the output of gate G2 to go high. The output of gate G2 is coupled to a release timer 42 and through conductor 43 to inverter gate G3. The output of inverter gate G3 goes low. The output of gate G3 is connected to a reset timer 45 over conductor 44 and to one of the inputs of gate G4 over conductor 46.

Responsive to the change from high to low on conductor 44, the output of the reset timer on conductor 47, which is coupled to the reset terminal on processor 13, goes low after a definite time lapse. In one preferred embodiment the time lapse was approximately 85 milliseconds. During the 85 milliseconds, while the output of the reset timer 45 is still high, the processor 13 is being reset.

Responsive to the low on the input of gate G4, the output of gate G4 on conductor 48 goes high. Conductor 48 goes into an input of gate G6. The high on the input of gate G6 causes its output to go low.

The low output of gate G6 is coupled to the base of transistor Q1 through conductor 49 and resistor R5. Responsive to the positive signal on the emitter of transistor Q1 and the low signal on the base of transistor Q1, transistor Q1 is switched to its conducting state. The collector of transistor Q1 is coupled to the gate of transistor Q2 over the voltage divider comprising resistors R6 and R7 connected to conductor 21.

Responsive to the operation of transistor Q1 to its conducting condition, transistor Q2 also is switched to its conducting condition. The current from the line now passes through the bridge 18, transistor Q2, inductor H2 and capacitor C3 bridged by zener diode Z2. The positive voltage is applied to the processor over a circuit that extends from lines L1, or L2 through diodes D1 or D2, conductor 24, conductor 37, conductor 51 through diode D13 to the V+ terminal of processor 13. The negative voltage is applied over a circuit that extends from the lines, diodes D6 or D5, conductor 21, transistor Q2, inductor H2, conductor 34 and through conductor 52 to the V— terminal of the processor.

The memory 14 receives its power over conductor 33 connected into the V+ terminal of the memory and over conductor 53 connected between conductor 52 and the V— terminal of the memory. Filter capacitor C5 is coupled between the positive and negative voltage terminals of the processor.

After the processor is reset, it checks the call restriction switches 16 (TR1-TR4) to determine if any of them have been switched on. That information is used to determine whether a restricted number is dialed. After the call restrictions have been checked, the processor switches the muting output to high and the dial pulse DP output to low.

Responsive to the muting signal going high and the high obtained over conductor 27, from gate G8 gate G7 provides a low output. The low output of gate G7 is coupled to the base of transistor Q3 through conductor 54 and resistor R9. The emitter of transistor Q3 is coupled to conductor 31 and thus is connected to the positive voltage of the line via diode D9 and the bridge. The collector of transistor Q3 is coupled to the gate of both transistors Q4 and Q5 through resistor R8 and conductors 56 and 57, respectively.

Since the drains of transistors Q5 and Q6 are connected to negative voltage on conductor 21, both transistors Q4 and Q5 conduct at this time. With transistor Q4 conducting, the telephone network is connected to negative voltage on conductor 21 through conductor 22.

The telephone system to which the telephone is connected now returns dial tone. The current from the line is coupled through the rectifier bridge 18 and passes through transistor Q4 and the network 12. Some of the current also passes through transistor Q5 and to inductor H1 and zener diode Z2 and switch contacts S1-1. This current provides the power for operating the processor 13 and the memory 14.

Coupled between the gates of transistors Q4, Q5 and negative voltage on conductor 21 are parallel filter capacitor C6 and biasing resistor R15.

With transistors Q2, Q4 and Q5 conducting, the telephone is now ready for dialing.

When a key on the keypad 15 is depressed, then both the dial pulse and the muting outputs of the processor 13 go low. Responsive to the low signal at the muting output, the output of gate G7 goes high. A high on conductor 54 switches transistor Q3 to its off condition. With transistor Q3 in the off condition, both transistors Q4 and Q5 are also switched to the off condition. Therefore, only transistors Q1 and Q2 are in their conducting states.

The digits are keyed with the keypad and through the processor stored in the memory. While a key is depressed, the processor extends a feedback tone over conductor 58, coupling capacitor C4, conductor 75 and resistor R15 to conductor 22 and the telephone network 12. The tone provides the user with audible feedback when dialing.

Processor 13 generates dial pulses in a well known manner corresponding to the digits keyed up. The dial pulses are transmitted to the line over conductor 59, causing the operation of gates G5, G6 and transistor Q2, operated responsive to the operation of transistor Q1.

During the interdigital time the transistors Q1 and Q2 are conducting. During the pulse time they are non-conducting. This is shown in the timing diagram of FIG. 2.

The dial pulse output and the muting output of the processor go to a high level, when all the digits keyed up have been transmitted. Responsive to a high on the dial pulse output, conductor 59 transmits the high to the input of gate G5. The output of gate G5 goes low which causes gate G6 to transmit a high through conductor 49, resistor R5 to the base of transistor Q1, switching off transistor Q1 and consequently switching off transistor Q2. The high at the muting output switches on transistor Q3 and consequently switches on transistors Q4 and Q5 as previously described.

The telephone is now in the "talk mode" with the network connected to the lines and transistors Q1 and Q2 switched off.

It should be noted that whenever a number is dialed, the processor stores this number in the memory. The user may redial the number merely by depressing a specified button or key, such as the "#" key.

The memory is used to store frequently used numbers. The stored numbers may each be recalled through the use of a single or multi-digit number. Thus, using the numbers 01 through 99, a total of 99 numbers may be stored. The number specifying the memory location must be keyed in order to store the number in that location and to recall the number from that location for dialing out.

Means are provided for restricting dialed calls. More particularly, switches TR1-TR4 may be used to select one of fifteen different call restriction programs. If none of the switches is activated, then all calls are unrestricted. If certain of the switches are activated, then there are restrictions imposed on the called number. If a restricted number is called, then the processor will not transmit this digit into the line.

A common way of bypassing call restriction is for the calling party to stay off-hook after a call has been completed and the called party has hung up. Restriction bypass means are provided in order to prevent the call restriction feature from being bypassed. More particularly, a timer is provided which initiates operation after each digit is dialed. If more than approximately thirty seconds elapses without a digit being dialed, then the processor disables the dial. This disabling feature is generated inside the processor.

Another way of bypassing restrictive measures is for an adroit calling party to use the hook switch for transmitting digits without going through the processor. Means are provided for preventing the hook switch from being used for generating calling dial pulses. More particularly, a release timer is provided which causes the line to be released, when the hook switch is flashed.

Figure 2:
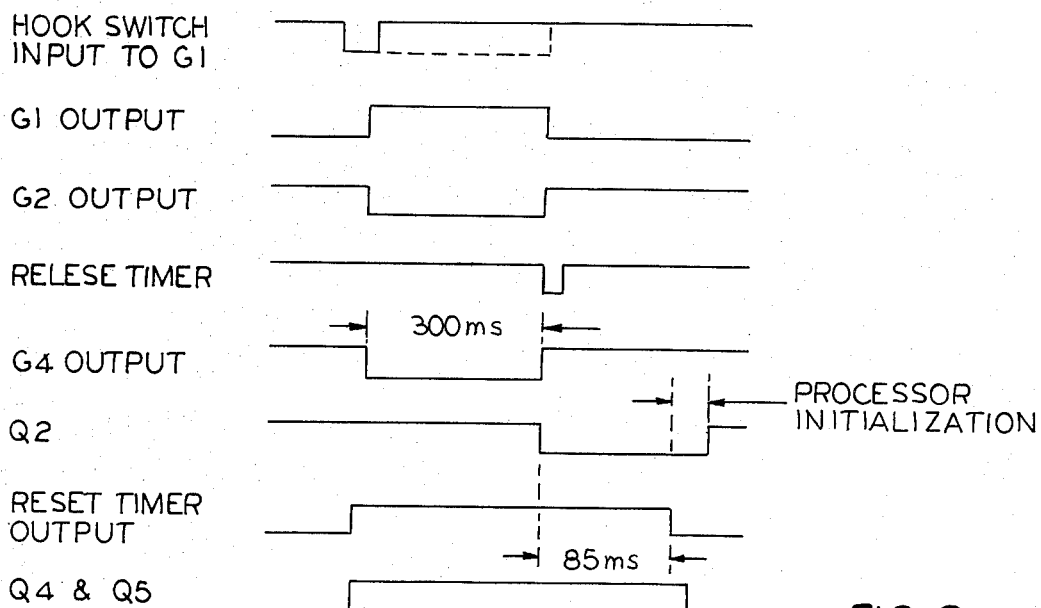
FIG. 2 is a timing diagram showing the relationship of signals initiated by flashing of the hook-switch.

The timing diagram in FIG. 2 shows what occurs when the hook switch is flashed. In this timing diagram, it can be seen that all the transistors are switched off for a time period of a minimum of 300 milliseconds; and therefore, the loop is switched open for that period of time, causing the connection to be released.

In particular, when the hook switch is flashed, contacts HSW#2 apply a low level to one of the inputs of gate G1. When hook switch contacts HSW#2 disconnects conductor 38 from conductor 29, then resistor R22, connected between conductors 50 and 38, couples the low level from conductor 52 over conductors 50 and 38 to the input of gate G1 through conductor 41. When the hook switch is flashed, the armature of hook switch contacts HSW#2, which are connected to conductor 29, move between conductors 32 and 38. Thus, it provides a positive or high pulse to conductor 32.

Conductor 32 is connected directly to the negative input of gate G2. When gate G1 has a high at its input, it provides a low input to gate G2. Thus, the periods of time when the armature of hook switch contacts HSW#2 are coupled to line 32, then the output of gate G1 is high and the output of gate G2 is low.

A low output at gate G2 is coupled to release timer 42 and causes the release timer to provide a low output pulse after 300 milliseconds. The low output pulse from release timer 42 is coupled to the negative input of gate G4 over conductor 61. The high into gate G4, during the 300 milliseconds, while the output of the release timer is high, causes the output of gate G4 to go low and the outputs of gates G6 to go high. However, after 300 milliseconds, the output of gate G6 goes low operating transistors Q1 and Q2 to conduct.

During the 300 milliseconds, the output of the release timer is high; and therefore, the output of gate G4 is low. Thus, during the 300 milliseconds, transistor Q2 does not conduct; but, after the 300 milliseconds, the output of gate G6 goes low and transistors Q1 and Q2 are turned on. When the hook switch is flashed, transistors Q1 and Q2 will stay off for a minimum of 300 milliseconds causing the line to be released.

Responsive to the low on the input of gate G3 through conductor 43, the output goes high. That causes the output of reset timer to go high, resetting the processor. When the processor is reset, the muting output goes low causing the output of gate G7 to go high. A high at the output of gate G7 is coupled via conductor 54 to switch off transistor Q3 and consequently transistors Q4 and Q5.

The output of gate G4 is fed back to one of the inputs of gate G1 through conductor 62. This feedback path assures that the loop will be switched open for the timing period of the release timer, even if the hook switch is flashed to generate a pulse of shorter duration. The reset timer 45 keeps the processor reset for a duration of 85 milliseconds after the hook switch is in the off hook condition and until after the release timer has timed out.

The reset timer thereby assures that the processor is being reset until full voltage has been applied to the processor when the telephone subset goes off hook. A secret code may be used in the programmer to bypass call restrictions. The secret code would be stored in the memory and enable authorized personnel to call without restrictions.

Means are provided to enable repertory dialing in a dual tone multi-frequency signalling mode. More particularly, the processor may generate dual tone multi-frequency signals and feed those tones into the line. The inductor H2 provides a DC path for the line current in the "dial mode" with a high AC impedance. The high AC impedance is necessary to be able to insert the dual tone multi-frequency signals.

In dialing with the dual tone multi-frequency signals, the transistors Q1 and Q2 are switched on. The transistors Q3, Q4 and Q5 are switched off. A tone feedback is coupled through conductor 58, capacitor C4, resistor R15, the network 12 and caapacitor C1.

The diodes D7, D8, resistor R16, gate G8 and filter capacitor C7 form an open loop detector, when the telephone is in an off-hook condition; then the loop current level conducted through conductor 27 enables gates G6 and G7. If there is a loop current interruption where the cathode side of diodes D7 and D8 is pulled low by the output of gate G8 through resistor R16, then, the output of gates G7 and G6 go high, switching off transistors Q1, Q2, Q3, Q4 and Q5. This places the processor in a "standby mode" in order to reduce current drain.

Gate G8 provides open loop detection during the break period of dial pulses. The output of gate G8 goes high only during the break period of dial pulses. Capacitor C7 filters transients received on the line. The diode D15 disables open loop detection, when external power is used. The resistor R21 pulls the input to gate G2 low in the off-hook condition.

Means are provided for self-testing the system by keying up instructions. The processor can be made to test all memory locations automatically. When a faulty memory location is found, the tester is alerted and, using an oscilloscope, the faulty memory may be identified.

FIG. 2 shows the timing sequence of the hook flashing protective system to preclude the use of flashing the hook switch to circumvent the call restriction circuitry.

Figure 3:
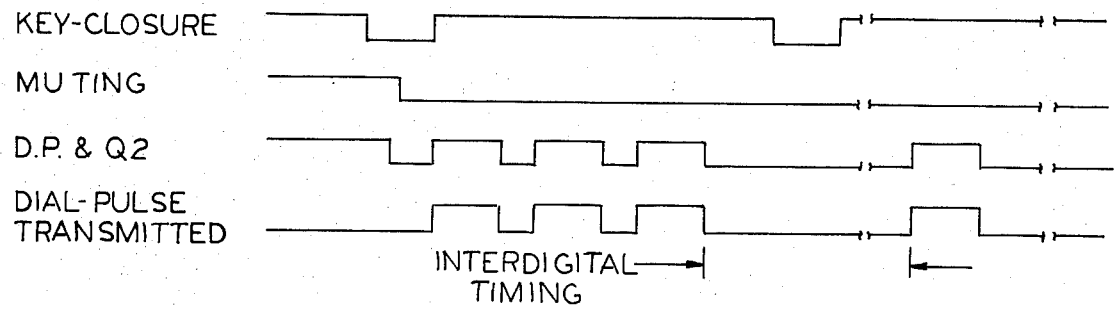
FIG. 3 is a timing diagram showing the relationship between the closure of keys, the dial pulses, and the muting signal from the processor for rotary dialing.

FIG. 3 shows the response to closing a key in the rotary dial. A muting signal is generated after a certain time period. The muting signal is a low. Similarly, dial pulse signals are also generated and transmitted. As previously explained, transistor Q2 conducts and turns off responsive to the dial pulse signals which results in dial pulses being transmitted.

Figure 4:
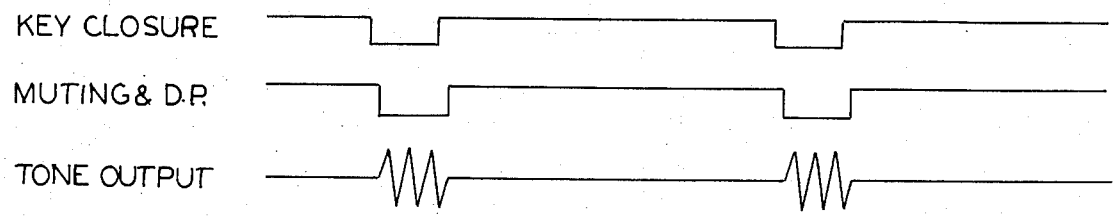
FIG. 4 is a timing diagram showing the relationship between the closure of keys, the muting signal and the multi-frequency dialing.

The dual tone multi-frequency dialing is shown in FIG. 4. As shown therein, responsive to a key closure on keypad 15. The muting and dial pulse outputs of the processor go low. The transistors Q1 and Q2 are switched on. Transistors Q3, Q4 and Q5 are switched off. The processor couples the dual tone multi-frequency signal via conductor 63, transistor Q2 and the bridge 18 into the line.

Figure 5:
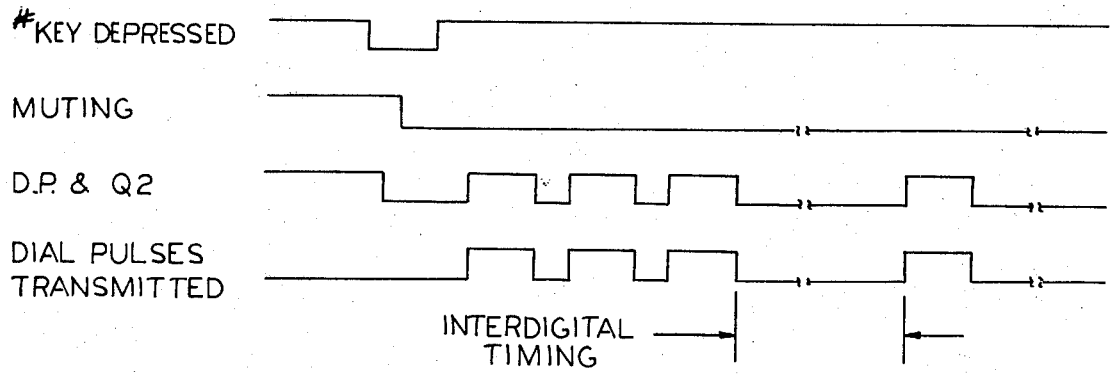
FIGS. 5 and 6 are timing diagrams showing the dial pulses and tone outputs in automatically redialing the last number dialed for rotary and dual tone multi-frequency repertory dialing, respectively.

FIG. 5 shows the timing diagram for redialing of the last number dialed with rotary outpulsing. Therein, when a number key is depressed, a muting signal is generated after a certain time period. Responsive to both the muting signal and the dial pulse signal which causes the operation of transistor Q2, dial pulses are transmitted via transistor Q2 into the telephone line.

Figure 6:
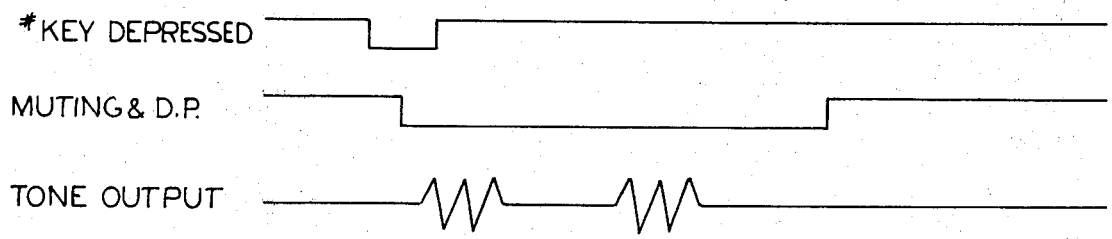

Re-dialing of the last number dialed is generally accomplished, when using the dual tone multi-frequency system, as shown by the timing diagram of FIG. 6. After the key is depressed, the muting and dial pulse signals are shown as lows. During the lows, the dual tone output is transmitted over the circuitry extending over conductor 63, as previously described.

For long lines it is required to use external power for powering the processor and the memory. When it is required to use external power, the switch S1 must be operated. The contacts S1-2 connect conductor 19 to conductor 34. The zener diode Z2 and capacitor C3 are disconnected by contacts S1-1.

The voltage regulator 71 is switched on when the telephone is lifted off-hook; that is, contacts HSW#2 apply positive voltage via conductor 38 and conductor 74 to the voltage regulator. This causes the voltage regulator to be switched on. The negative output from the voltage regulator 71 is coupled via conductor 73, conductor 30, conductor 52 and conductor 53 to the memory and the processor. The positive output is coupled via conductor 72, conductor 24, conductor 37, conductor 51 and diode D13 to the processor. The positive voltage is also coupled to the memory via conductor 24, diode D9, conductor 36 and conductor 33.

In a preferred embodiment the processor used includes, among other things, a Motorola MC141200. The memory used is a plurality of Harris HM-6551 chips. The gates are:

G1—RCA 4011
G2—RCA 4001
G3—RCA 4069
G4—RCA 4011
G5—RCA 4069
G6—RCA 4023
G7—RCA 4011
G8—RCA 4001

While the principles of the invention have been described above in connection with specific apparatus and applications, it is to be understood that this description is made by way of example only and not as a limitation on the scope of the invention.

We claim:

1. An improved telephone dialing system comprising a telephone substation;
    said substation comprising:
    a network;
    bridge means connecting said network to the telephone lines;
    hook switch contacts between said bridge means and said telephone lines;
    at least a first and a second conductor means extending from said bridge means for coupling said network through said bridge means and said hook switch contacts to said telephone lines;
    first switching means in at least one of said first and second conductors for completing the connection of said network to said bridge means;
    control means for switching said first switching means between conducting and non-conducting states;
    said control means operated responsive to an open loop condition;
    said dial signal generating means including memory means for storing telephone numbers therein;
    first isolating circuit means to couple said memory means to said telephone lines for powering said memory means when said telephone substation is in the on-hook condition;
    internal power supply means for powering said dial signal generating means in the off-hook condition; and
    said bridge means including second isolating circuit means for connecting said internal power supply means to receive power from said telephone lines.

2. The improved telephone dial system of claim 1 wherein said second isolating means are provided for minimizing leakage through said internal power supply means and through said bridge means in the on-hook condition.

3. The improved telephone dial system of claim 1 wherein said internal power supply has one side connected to a junction of first and second diodes in said bridge means and has the other side connected through second switching means to a junction of third and fourth diodes of said bridge means,
    said first and second diodes having the anodes thereof coupled to said lines,
    said third and fourth diodes having the cathodes thereof coupled to said lines,
    said second switching means conducting responsive to an off-hook condition of said hook switch contacts and to dial pulse signals from said dial pulse generating means,
    said network having one side connected to a junction of fifth and sixth diodes of said bridge means and having the other side connected through said first solid-state switching means to the junction of said third and fourth diodes,
    said internal power supply means comprising capacitor means connected through said bridge means to said lines to receive a charge from said telephone lines during said off-hook condition for supplying power to said dial signal generating means during dial pulse break periods, and
    voltage regulating means bridging said capacitor means.

4. The improved telephone dial system of claim 3 wherein said dial signal generating means comprises processor means,
    said memory means operated responsive to signals from said processor for storing a plurality of selected numbers,
    key means attached to said processor for initiating the storage of said plurality of telephone numbers and for initiating the outpulsing of said plurality of telephone numbers responsive to keying in at least one digit, and
    wherein means are provided for powering said memory means from said line connected at the side of the hook switch contacts away from said bridge means, whereby said memory means is powered, even in the on-hook condition to retain said plurality of numbers.

5. The improved telephone dial system of claim 4 wherein battery means are provided to power the memory means in the event the telephone substation is unplugged from the telephone line.

6. The improved telephone dial system of claim 5 wherein means are provided for preventing leakage of said battery thereby assuring that said battery means retains its power for a long period of time.

7. The improved telephone dial system of claim 5 wherein said processor means provides push button to rotary conversion.

8. The improved telephone dial system of claim 7 wherein means are provided for enabling the push button to rotary conversion with reverse polarity on said telephone lines.

9. The improved telephone dial system of claim 5 including
auxiliary power supply means for augmenting said internal power supply for use on long loops.

10. The improved telephone dial system of claim 4 wherein voltage suppressor means are provided on the bridge side of said hook switch contacts, whereby said first isolating circuit means for connecting said memory to said telephone lines on the side of said hook switch contacts away from said bridge means side blocks direct leakage through said suppressor and bridge means, when said network is in the on-hook condition.

11. An improved telephone repertory dialing system including a telephone substation network,
first bridge means between said network and telephone lines for connecting said substation to other telephone lines,
hook switch contacts between said bridge means and said telephone lines,
conductor means for connecting said network to said bridge means,
dial signal generating means,
repertory memory means included in said dial signal generating means,
the improvement characterized in this that:
power connection means are provided for said memory means to obtain power from the line side of the hook switch contacts,
internal power supply means connected to power said dial signal generating means, and
isolation means including second bridge means for connecting said internal power supply means to obtain power from said telephone lines while isolating said internal power supply means from a discharge path through the network.

12. The improved telephone repertory dialing system of claim 11 including means for supplying power to said memory, even when said telephone is disconnected from said telephone lines.

13. The improved telephone repertory dialing system of claim 12 wherein said power connection means includes impedance means for preventing interference with said telephone lines in the on-hook condition of said hook switch contacts.

14. The improved repertory dialing system of claim 12 wherein call restriction means are provided.

* * * * *